United States Patent Office 3,129,318
Patented Apr. 14, 1964

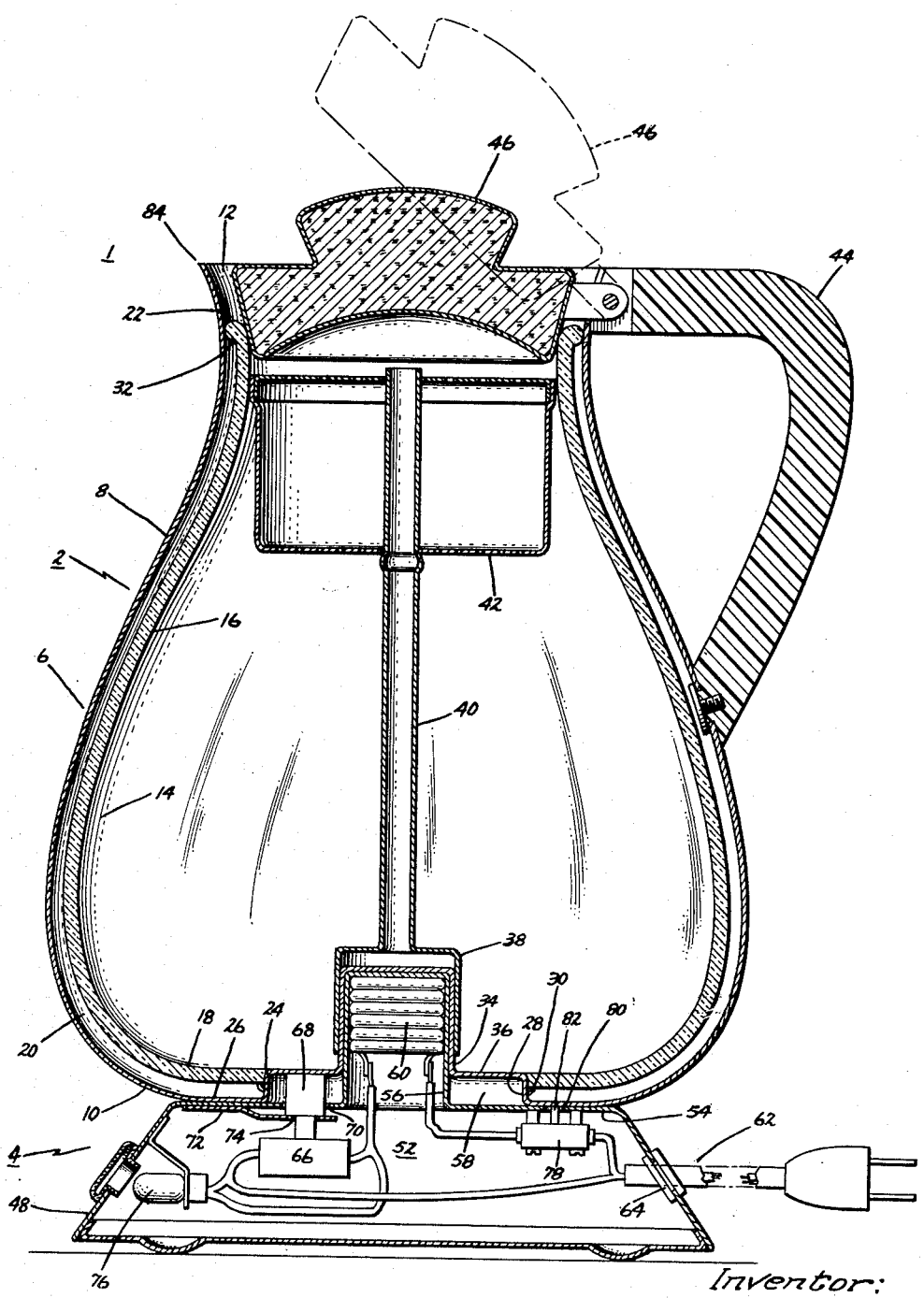

3,129,318
COFFEE PERCOLATOR
James L. D. Morrison, 7551 Melrose Ave.,
Los Angeles, Calif.
Filed May 22, 1961, Ser. No. 111,605
4 Claims. (Cl. 219—43)

This invention relates generally to electric coffee percolators.

The most common variety of coffee maker presently being sold is the automatic electric percolator. The conventional automatic electric coffee percolator comprises a pot having the usual pump and basket therein with a base permanently secured to the pot and having the heating and thermostat elements therein. In such conventional percolators, the thermostat senses the temperature of the liquid in the pot and reduces the heating from a high, water-boiling level to a low holding heat after percolation of the coffee has been completed. With this arrangement, the percolator must remain connected to the source of energizing potential or the coffee will rapidly cool. In many homes, there is no convenient way to connect the percolator at the table and in any event having the electrical lead attached to the percolator is not desired. However, if the percolator is unplugged, carried to the table or elsewhere to pour coffee, and then reconnected, the thermostat may again turn on the high heat thus causing the coffee to boil.

In accordance with my invention, I have provided an electric percolator construction in which the pot element is removably supported on the base and includes a wall having thermal-insulating properties preferably of the double wall type. With this arrangement, the pot may be removed for pouring coffee without carrying the base and cord therewith and the pot may be readily immersed in water for cleaning.

It is accordingly an object of my invention to provide an improved electric coffee percolator construction.

Another object of my invention is to provide an improved automatic electric percolator construction.

A further object of my invention is to provide an improved electric coffee percolator construction wherein the pot element is separated from the base element.

Yet another object of my invention is to provide an improved electric coffee percolator construction wherein the pot element has thermal insulating properties and is separated from the base element.

My invention in its broader aspects provides an electric coffee percolator comprising a pot having a bottom wall and a side wall defining an open top. At least the side wall of the pot has thermal insulating properties and at least a portion of the bottom wall has heat-conduction properties, an electrical heating element being provided in close proximity with the bottom wall portion. In the preferred embodiment of my invention, the pot is provided with an outer wall formed of relatively thin sheet metal and an inner wall closely spaced from the outer wall and defining a dead air space therewith, the inner wall having an annular opening formed therein in its bottom thereby to expose a portion of the bottom of the outer wall to the interior of the pot.

The single figure of the drawing is a cross-sectional view of my improved electric coffee percolator construction.

Referring now to the drawing, my improved percolator construction, generally indicated at 1, comprises separable pot and base elements 2 and 4. Pot element 2 comprises an outer wall 6, preferably formed of relatively thin sheet metal and having a side wall portion 8 merging with a bottom wall portion 10, the side wall portion 8 defining an open upper end 12. An inner wall 14, preferably formed of glass, is provided having a side wall portion 16 merging with a bottom wall portion 18. It will be observed that inner wall 14 is closely spaced from outer wall 6, as at 20. The upper end 22 of inner wall 14 is joined to side wall 8 of outer wall 6 adjacent the open upper end 12.

The bottom wall 18 of the inner wall 14 has an annular center opening 24 formed therein. Bottom wall 10 of outer wall 6 has an outer annular portion 26 with a first re-entrant portion 28 extending upwardly therefrom through the center opening 24 in bottom wall portion 18 of inner wall 14. The first re-entrant portion 28 is annular and has a water-tight junction with opening 24 in bottom wall 18 being preferably integrally joined thereto as at 30. The upper extremity 22 of side wall portion 16 of inner wall 14 is also preferably integrally joined to side wall portion 8 of outer wall 16, as at 32 and the space 20 may be evacuated to form a conventional Thermos construction or may be merely employed as a dead air space.

Bottom wall portion 10 of outer wall 6 has another re-entrant portion 34 joined to the first re-entrant portion 28 by an intermediate annular portion 36 and extending upwardly into the interior of pot 2, as shown. It will now be seen that whereas side wall portion 8 and outer annular section 26 of outer wall 6 define with side wall portion 16 and bottom wall portion 18 of inner wall 14 a double-walled insulating construction, the intermediate annular portion 36 and re-entrant portion 34 of bottom wall 10 are of single thickness, high heat-conductive material.

It will be observed that re-entrant portion 34 receives a bottom end 38 of a conventional pump 40 which in turn receives the conventional coffee basket 42. Pot 2 is provided with a conventional handle 44 to which cover 46 is pivotally connected, as shown.

Base 4 comprises a side wall 48 and top wall 50 again formed of relatively thin sheet metal and defining a cavity 52. Top wall 50 of base 4 has an annular portion 54 which, it will be observed, removably supports the outer annular section 26 of outer wall 6 of pot 2. Top wall 50 of base 4 has a center annular projection 56 extending upwardly therefrom and joined to the annular wall portion 54. It will be observed that projection 56 is proportioned to be removably received by the re-entrant portion 34 of pot 2 and to engage the interior walls of the same. It will further be observed that the annular wall portion 54 and projection 56 of base 4 define with intermediate annular portion 36 and re-entrant portion 28 of pot 2 an annular cavity 58.

A conventional electrical heating element 60 is positioned within projection 56 of base 4 and is preferably in intimate contact therewith in order to effect maximum heat-transfer through the wall of projection 56 and the re-entrant portion 34 for boiling the water in the pot 2. A cord 62 is provided for energizing heater 60 which extends into cavity 52 through a suitable grommet 64 in side wall 48 of base 4.

A conventional thermostatic switch 66 is provided within cavity 52 of base 4 and having a heat sensing element 68 extending upwardly therefrom. Annular portion 54 of top wall 50 of base 4 has an opening 70 formed therein communicating with cavity 58. A suitable leaf spring 72 has one end secured to annular portion 54 of top wall 50 of base 4 and has an opening 74 in its other end which supports thermostat 66 with heat sensing element 68 extending upwardly through opening 70, the spring 72 urging the heat sensing element 66 into engagement with the intermediate annular wall portion 36 of pot 2. Thermostat 66 is coupled to the heating element 60 and to a suitable pilot light 76, as is well known to those skilled in the art. In the preferred embodiment of my invention when the water within the pot 2 reaches a predetermined temperature as sensed by the sensing element 68, thermostat 66 entirely disconnects heating element 60 from the electrical lead 62 and the source of power to which it is connected. However, the thermostat 66 may equally well be arranged merely to reduce the heating of the heating element 60 in response to boiling of the water in the pot 2.

Since in accordance with my invention, pot 2 preferably is intended to be entirely removed from the base 4, it then is desirable to provide another switch which will completely disconnect heating element 60 from the source of power when the pot is removed. For this purpose I show a conventional single pole, single throw micro-switch 78 in cavity 52 and mounted on annular portion 54 of top wall 50 of base 4. Another opening 80 is formed in annular wall portion 54 and switch actuating element 82 extends upwardly therefrom to engage the outer annular portion 26 of bottom wall 10 of the pot 2. Switch 78 is suitably connected in series with electrical lead 62. It will thus be seen that when pot 2 is resting upon the base 4, switch actuating element 82 will be depressed thus closing the contacts of switch 78 to connect heating element 60 and thermostat 66 to the source of energizing potential.

It will be readily seen that by eliminating the base and electrical elements from the percolator per se, the pot element can be made much smaller and lighter in weight than conventional automatic electric percolators of equal capacity. It will be seen that I have provided a percolator construction employing a double wall or Thermos-type container with however the heat being applied through a single-walled part of the bottom of the pot. It will be readily comprehended that while I have shown a double-wall form of thermal insulating construction for pot 2 and have indicated that the outer wall 6 is preferably formed of relatively thin sheet metal, the space 20 between the inner and outer walls need not in fact be evacuated and further, both the inner and outer walls may be formed of suitable plastic material, which would, however, require that at least the reentrant portion 34 still be formed of relatively thin sheet metal for its heat conduction properties. It will also be comprehended that the thermal-insulating portion of the pot may equally well be formed of other thermal-insulating material such as commercially available porous plastic foam material with liquid-impervious surfaces.

While I have shown a rather conventional heat pump arrangement in which the re-entrant portion 34 extends upwardly into the interior of the pot and with the pump having a portion 36 fitting thereover, it will be readily comprehended that my invention is equally applicable to a reversal of these parts which is also a conventional heat pump arrangement, i.e. with the pump extending downwardly into a well. Further, while I have shown the switch 78 as being directly mounted on annular portion 54 of wall 50 of base 4 so as to be directly actuated by the positioning of pot 2 on the base 4, the switch 78 may equally advantageously be mounted for actuation by the spring 72. While the preferred embodiment of my invention incorporates thermostat 66, it will be seen that the broader aspects of my invention do not require the use of a thermostat and the timing may be accomplished in other manners, or in fact the heating element 60 may be directly connected to the electrical lead 62 which then is manually disconnected to the source of energizing potential when the coffee has been sufficiently brewed.

While my invention lends itself particularly to the preferred arrangement described above in which the pot 2 is removable from base 4, my invention is applicable to an arrangement in which pot 2 is permanently attached to base 4. In this case, the double wall 34, 56 may be eliminated by omitting projection 56 and securing annular wall portion 54 of base 4 directly to annular wall portion 26 of pot 2, as by spot welding. Further in this construction, cord 62 would not be permanently attached to the device, but would plug into a suitable receptacle on base 4 to permit carrying the pot to the table.

While I have shown a lip-type pouring section 84, it will be readily apparent that a suitable spout may be also employed.

While I have illustrated and described a specific embodiment of my invention, further modifications and improvements will occur to those skilled in the art and I intend therefore in the appended claims to cover all modifications which do not depart from the spirit and scope of my invention.

What is claimed is:

1. In a coffee percolator: a pot having an imperforate outer wall formed of relatively thin sheet metal and having a bottom wall portion and a side wall portion which defines an open top; an inner wall formed of glass within said outer wall and closely spaced therefrom, said inner wall having a bottom wall portion with an annular center opening therethrough; said bottom portion of said outer wall having an outer annular section and a first annular re-entrant portion extending upwardly therefrom through said annular center opening in said bottom wall portion of said inner wall and being sealed thereto, said bottom wall portion of said inner wall being closely spaced from said outer annular section of said bottom wall portion of said outer wall, said inner wall having an upper extremity joined to said side wall portion of said outer wall adjacent said open top thereby defining an insulating space; said bottom wall portion of said outer wall having a second re-entrant portion of smaller diameter than said first re-entrant portion and joined thereto by an annular intermediate wall portion, said second re-entrant portion extending upwardly into the interior of said pot; and an electrical heating element positioned within said second re-entrant portion and in close proximity thereto.

2. In a coffee percolator: a pot having an outer wall formed of relatively thin sheet metal and having a bottom wall portion and a side wall portion which defines an open top; an inner wall formed of non-metallic material within said outer wall and closely spaced therefrom to define an insulating space therewith, said inner wall having a bottom wall portion with an annular center opening formed therein, said bottom wall portion of said inner wall being closely spaced from said bottom wall portion of said outer wall, said bottom wall portion of said outer wall having a re-entrant part extending through said center opening in said bottom wall portion and sealed thereto, said re-entrant part communicating with the interior of said pot; and a base for said pot having a top wall formed of relatively thin sheet metal, said top wall having an annular portion formed removably to support said bottom wall portion of said outer wall of said pot, said top wall having a center projection extending upwardly therefrom and proportional to be received by said re-entrant port and to engage the interior thereof, and an electrical heating element disposed within said projection and in close proximity thereto.

3. The combination of claim 2 further comprising a thermostatic switch having a heat-sensing element extending therefrom, said annular portion of said top wall of said base having an opening formed therethrough, a spring means supporting said switch on said top wall on the side thereof remote from said pot with said heat-sensing element in engagement with said bottom wall portion of said outer wall of said pot, said switch being electrically coupled to said heating element for controlling the same.

4. In a coffee percolator: a pot having an imperforate outer wall formed of relatively thin sheet metal and having a bottom wall portion and a side wall portion which defines an open top; an inner wall formed of glass within said outer wall and closely spaced therefrom, said inner wall having a bottom wall portion with an annular center opening therethrough; said bottom portion of said outer wall having an outer annular section and a first annular re-entrant portion extending upwardly therefrom through said annular center opening in said bottom wall portion of said inner wall and being joined thereto, said bottom wall portion of said inner wall being closely spaced from said outer annular section of said bottom wall portion of said outer wall, said inner wall having an upper extremity joined to said side wall portion of said outer wall adjacent said open top thereby defining an insulating space; said bottom wall portion of said outer wall having a second annular re-entrant portion of smaller diameter than said first re-entrant portion and joined thereto by an annular intermediate wall portion, said second re-entrant portion extending upwardly into the interior of said pot; and a base for removably supporting said pot, said base having a side wall and a top wall formed of relatively thin sheet metal and defining a cavity, said top wall having an annular portion for supporting said annular section of said bottom wall portion of said pot outer wall, said top wall having an annular center projection joined to said annular portion and extending upwardly therefrom, said projection being proportioned to be received within said second re-entrant portion and to engage the same, said projection and annular portion of said base top wall defining an annular cavity with said first-re-entrant portion and intermediate wall portion of said pot; an electrical heating element positioned within said projection and in engagement therewith; a thermostatic switch having a heat-sensing element extending therefrom, said annular portion of said base top wall having an opening therethrough communicating with said annular cavity; a leaf spring in said base cavity having one end secured to said top wall annular portion and its other end supporting said thermostatic switch within said cavity with said heat-sensing element extending through said opening in said base top wall annular portion and urging the same into engagement with said pot intermediate wall portion, said thermostatic switch being electrically coupled to said heating element for controlling the same; and another switch in said base cavity and supported for actuation responsive to said pot being supported on said base, said other switch being coupled to said heating element.

References Cited in the file of this patent
UNITED STATES PATENTS

| | | |
|---|---|---|
| 1,943,386 | Johnson | Jan. 16, 1934 |
| 1,987,892 | Duevel et al. | Jan. 15, 1935 |
| 2,500,390 | Wales | Mar. 14, 1950 |
| 2,526,566 | Kolisch | Oct. 17, 1950 |
| 2,796,823 | Solomon | June 25, 1957 |
| 3,078,785 | Antonelli | Feb. 26, 1963 |